United States Patent [19]

Laing et al.

[11] Patent Number: 4,880,362
[45] Date of Patent: Nov. 14, 1989

[54] ROTOR WITH STABILIZING MAGNETS

[76] Inventors: Karsten A. Laing; Oliver P. Laing, both of 2111 Illion St., San Diego, Calif. 92110; Nikolaus J. Laing, 1253 La Jolla Rancho Rd., La Jolla, Calif. 92037

[21] Appl. No.: 198,004

[22] Filed: May 24, 1988

[51] Int. Cl.⁴ .............................................. F04B 17/02
[52] U.S. Cl. .................................. 417/365; 417/420; 417/423.12; 417/423.7
[58] Field of Search ................... 417/365, 420, 423.12, 417/423.13, 423.14, 423.7; 310/90

[56] References Cited

U.S. PATENT DOCUMENTS

| | | | |
|---|---|---|---|
| 3,107,310 | 10/1963 | Carriere et al. | 417/420 |
| 4,043,706 | 8/1977 | Walker | 417/420 X |
| 4,057,369 | 11/1977 | Isenberg et al. | 417/365 |
| 4,523,896 | 6/1985 | Llenry et al. | 417/423.12 X |
| 4,609,332 | 9/1986 | Miki et al. | 417/365 X |
| 4,615,662 | 10/1986 | Laing | 417/420 |
| 4,717,315 | 1/1988 | Miki et al. | 417/365 |

Primary Examiner—Carlton R. Croyle
Assistant Examiner—Eugene L. Szczecina, Jr.

[57] ABSTRACT

A rotor of an electric motor with a spherical magnetic gap or an impeller which forms a pivotably mounted rotating unit with an armature consists of a permanent magnetic annular member which is arranged juxtaposedly to a second stationary permanent magnetic annular member. The two magnets are spaced apart from each other by an air-gap and remain apart from each other because of their polarity. This prevents tumbling and counteracts the hydraulic thrust to prevent liftoff of the rotating unit from the step bearing.

7 Claims, 2 Drawing Sheets

ROTOR WITH STABILIZING MAGNETS

BACKGROUND OF THE INVENTION

The invention relates to rotors of electrical motors or magnetic couplings which exhibit a spherical magnetic airgap between the rotor and the driving stator or an outer magnetic ring driven by a motor. Such spherical motors or spherical magnetic couplings are becoming more and more important in modern pump design. The rotors or spherical motors or couplings are held in position by magnetic forces pressing the rotor against a stationary mounted ball. The impellers of pumps which form a unit with the driven rotor produce hydraulic thrust counteracting the magnetic thrust. When the electricity is switched off, the magnetic force of the driven stator stops immediately. In contrast, the hydraulic thrust, caused by the difference of pressure generated by the rotating impeller, decreases slowly as the rpm of the impeller decreases. The result is a tendency of the hydraulic forces to lift the impeller and the rotor away from the step bearing. The same change in the direction of axial thrust occurs in magnetic couplings, if the hydraulic forces can exceed the magnetic forces during operation. It is therefore necessary to support the rotor not only in the direction of the magnetic forces, but also to prevent movement in the opposite direction by means of a spherical bearing consisting of a cap and a ball. The fact that the rotor is supported by a step bearing makes it necessary, for the stator to point downwardly after installation. This is a serious drawback. Several methods are known for preventing movement in the opposite direction of the driving magnetic forces using mechanical means, such as the use of rings gliding on an undercut area of the ball. Their disadvantage is wear as well as unavoidable deformation during assembly.

SUMMARY OF THE INVENTION

The invention overcomes these disadvantages by applying magnetic forces. According to the invention a rotating and a stationary ring having the same polarity are arranged concentrically to the air gap thus generating a constant force in the direction towards the spherical step bearing. The repelling magnetic thrust prevents axial movement of the rotor while simultaneously realigning the rotor back into the plane of rotation when radial forces occur. This arrangement allows the pump to be installed in any position.

SHORT DESCRIPTION OF THE DRAWINGS

DETAILED DESCRIPTION OF THE PREFERRED EMBODIMENTS

Figure 1:
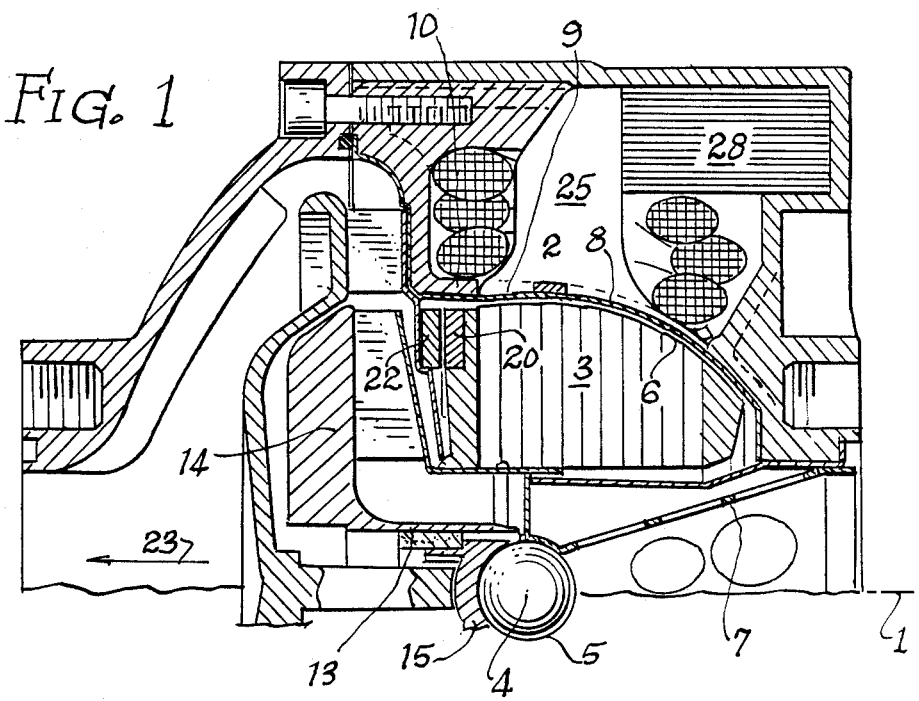
FIG. 1 shows a pump with radially magnetized rings and a channel through the stator.

The pump shown in cross-section in FIG. 1 comprises a stator 25, 28 in its dry compartment and an armature 3 forming a unit with an impeller 11,14 in the wet compartment. These compartments are separated by a magnetically permeable separation wall 8 having a spherical configuration. The armature 3 is attracted by the axial vector of the magnetic forces generated by the stator 25,28 and is pivotably supported by the spherical bearing consisting of a rotating bearing cap 15 and a ball 5 mounted on a stationary strut 7. The armature 3 forms a unit with ring 20 made of permanent magnetic material. This ring 20 is facing a second magnetic ring 22 mounted stationary. Both magnetic rings 20 and 22 are axially magnetized with a polarity producing repellant thrust. This repellant force prevents movement of the armature-impeller-unit 3,11,14 in the direction of arrow 23 and counteracts radial forces which try to tilt the armature-impeller-unit.

Figure 2:
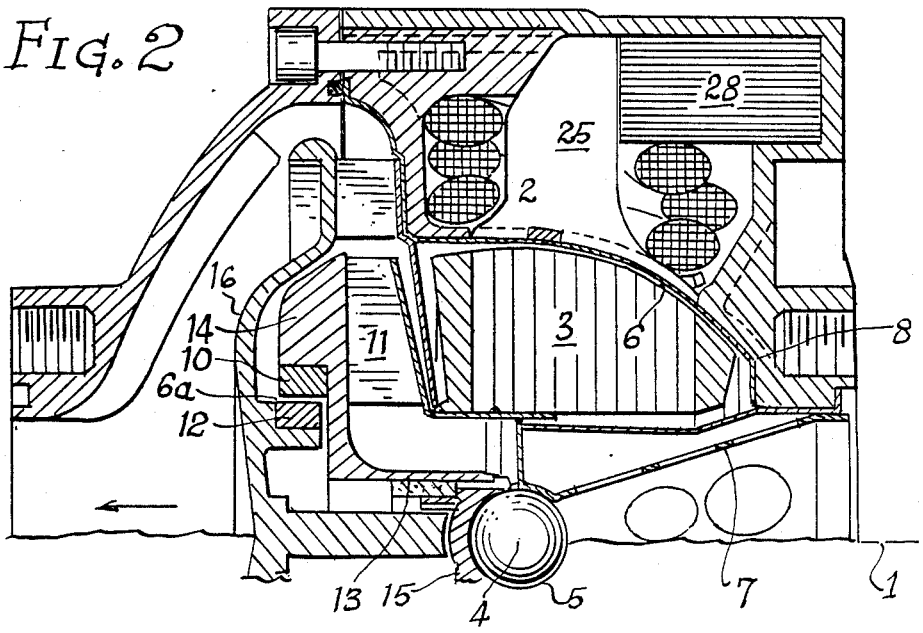
FIG. 2 shows a similar pump with axially magnetized rings.

FIG. 2 shows a similar design with two concentric, cylindric, permanent magnetic rings 10 and 12, which enclose a radial air-gap, and have the same magnetic polarity toward the air-gap, 6a. This embodiment is preferred in pumps which have sufficient axial thrust forces so that mainly forces trying to tilt the armature-impeller-unit are to be compensated.

Figure 3:
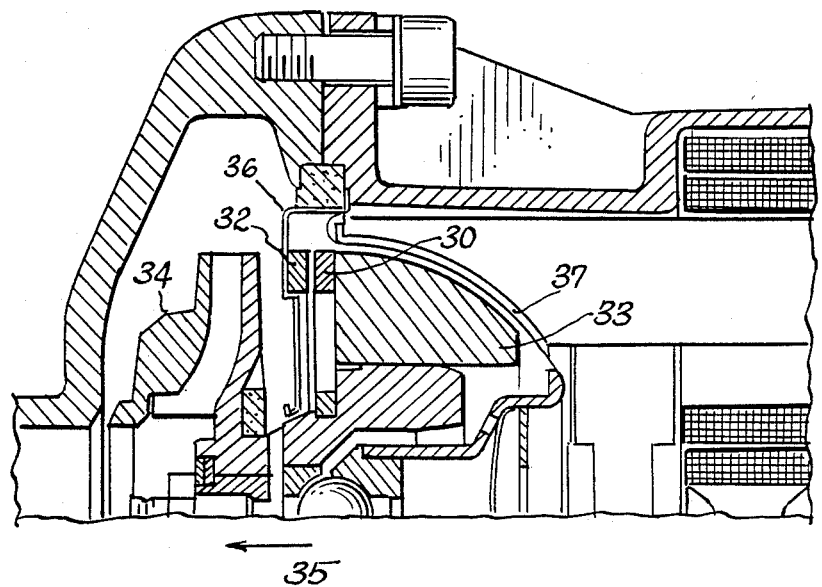
FIG. 3 shows a spherical pump with axially magnetized rings.

FIG. 3 shows a pump of the sphero-pump-type. The stator 38 attracts the armature-impeller-unit 33,34 by magnetic forces, while the impeller 34 produces hydraulic thrust in the direction of the arrow 35. When the power is switched off, the magnetic force stops immediately while the hydraulic thrust in the direction of arrow 35 disappears gradually with decreasing rpm. The two repelling magnetic rings 30 and 32 generate a permanent magnetic thrust larger than said hydraulic thrust, preventing axial movement of the armature-impeller-unit 33,34. These rings also prevent tilting of the armature-impeller-unit if there is an inconsistant distribution of radial forces over the circumference of the impeller 34.

Figure 4:
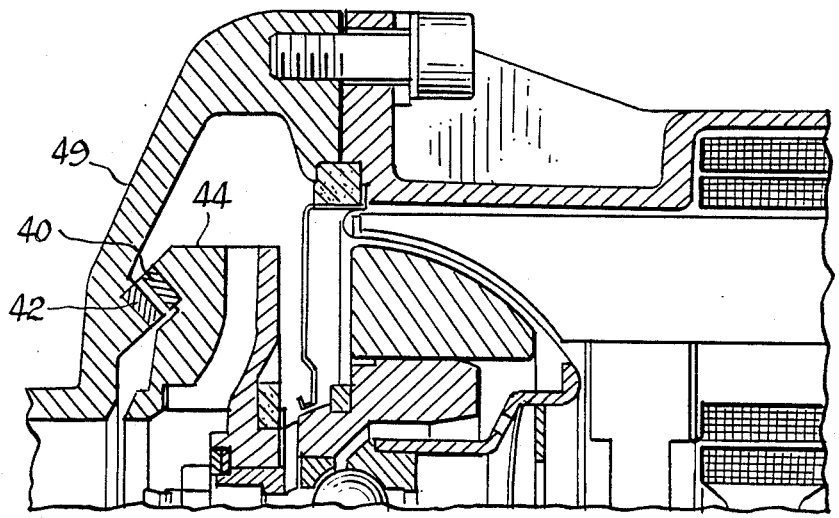
FIG. 4 shows a similar pump with rings surrounding the eye of the impeller.

FIG. 4 shows a similar design with conically shaped magnetic rings 40 and 42. This configuration is able to counteract radial as well as axial forces.

We claim:

1. A pump-motor-unit with a dry and a wet compartment separated by a magnetically permeable spherical wall (8), the dry compartment comprising a magnetic device (25,28) which produces a rotating magnetic field causing rotation of a spherical armature (3,33) rotatably and tiltably supported in its center, mounted in the wet compartment, that armature forming a rotary unit with an impeller (14,34,44) which contains a bearing cap (15) forming together with a stationary convex spherical counterpart (5) a spherical step bearing which supports the rotary unit (3-14, 33-34) radially and in the axial direction towards the stationary couterpart (5) of the cap (15), said stationary counterpart (5) being supported by the casing on a stationary structure (7), the rotary unit (3-14,33-34) being pushed during operation by the axially directed vector of the magnetic forces generated by said magnetic device (25,28) toward said magnetic device (25,28) counteracting movement of the rotary unit (3-14,33-34) in the direction (23,35) away from the magnetic device (25,28), said rotary unit (3-14,33-34) comprising a concentric annular permanent magnet (10,20,30) forming an unobstructed gap (6a) with a stationary annular permanent magnet (12,22,32) mounted inside the wet compartment, both magnets being magnetized perpendicular to the surface of said gap and both magnets facing the gap with their sides of the same polarity thereby generating thrust to stabilize the rotary unit (3-14,33-34) and to prevent axial movement.

2. A pump-motor-unit as per claim 1, characterized in that the gap between the two magnetized rings (20–22,-30–32) lies on a plane perpendicular to the axis (1) of the pump generating in addition axial thrust forcing the rotary unit toward the magnetic device (25,28).

3. A pump-motor-unit as per claim 1, characterized in that the rotating magnet (10,40) forms part of the impeller (11,44), forming a radial air gap (6a) with a stationary magnet (12,42).

4. A pump-motor-unit as per claim 3, characterized in that the air gap (6a) follows the circumference of an imaginary concentric cylinder.

5. A pump-motor-unit as per claim 3, characterized in that the air gap lies on a concentric imaginary cone.

6. A pump-motor-unit as per claim 1, characterized in that the rotating magnet (20,30) forms a unit with the armature (3,33).

7. A pump-motor-unit as per claim 1, characterized in that the stationary magnet (22,32) is situated between the impeller (14,34) and the armature (3,33).

* * * * *